(No Model.)
J. A. HUDGENS.
HUB.
No. 249,358. Patented Nov. 8, 1881.
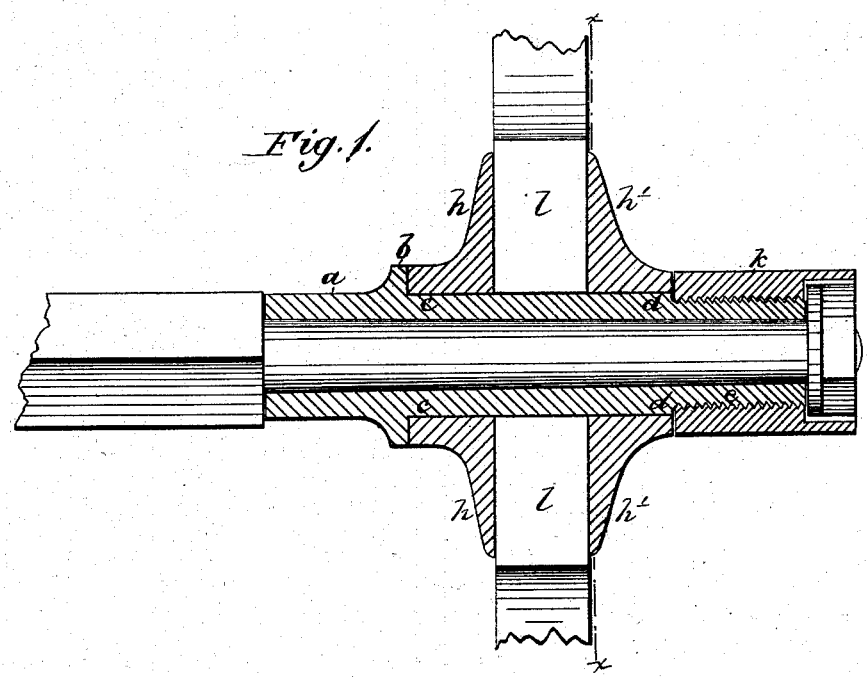
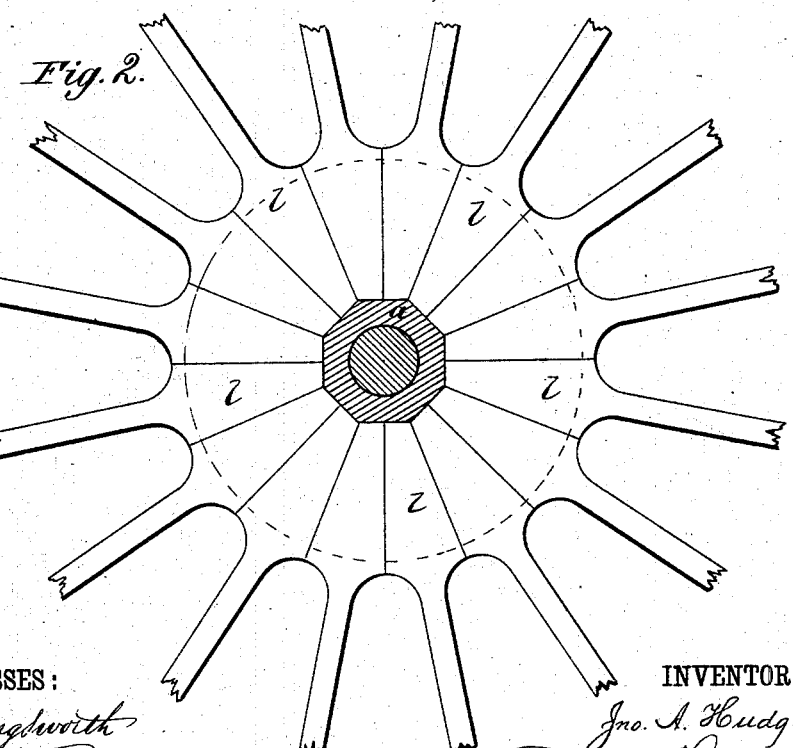
WITNESSES:
W. W. Hollingsworth
W. Read
INVENTOR:
Jno. A. Hudgens
BY
ATTORNEYS.

UNITED STATES PATENT OFFICE.

JOHN A. HUDGENS, OF PINE BLUFF, ARKANSAS.

HUB.

SPECIFICATION forming part of Letters Patent No. 249,358, dated November 8, 1881.

Application filed September 19, 1881. (No model.)

*To all whom it may concern:*

Be it known that I, JOHN A. HUDGENS, of Pine Bluff, in the county of Jefferson and State of Arkansas, have invented a new and useful Improvement in Wagon-Hubs; and I do hereby declare that the following is a full, clear, and exact description of the same, reference being had to the accompanying drawings, forming part of this specification, in which—

Figure 1 is a vertical central section. Fig. 2 is a sectional view on line $x\ x$, Fig. 1.

My invention relates to improvements in wagon-hubs; and it consists in the peculiar construction and arrangement of the parts, as hereinafter more fully set forth.

In the accompanying drawings, $a$ represents a tapering metallic axle-box, provided with a circular shoulder, $b$, near its inner end, against which the inner hub-collar abuts when the wheel is put together. That portion of the periphery of the axle-box lettered $c\ d$, lying between the circular shoulder $b$ and the nut, hereinafter described, which receives the hub collars or flanges and spokes, is made polygonal in form, and the remaining outer portion of the axle-box is made cylindrical, and screw-threaded on its outer surface, as shown at $e$.

$h$ represents the inner, and $h'$ the outer, hub-collar, each of which is provided with a central orifice the periphery of which is of the same polygonal form as the polygonal part of the axle-box, so that the hub-collars can readily be slipped lengthwise on the axle-box and be prevented from turning thereon. $k$ represents a nut, made polygonal on its outer end, so that it may more readily be seized by a wrench, and adapted to be screwed on the outer end of the axle-box. By this construction the wheel can readily be put together or taken apart when desired.

To construct the wheel, the axle-box is inserted in the polygonal-shaped orifice in the inner hub-collar, $h$, until the latter abuts against the circular shoulder $b$ on the axle-box. The spokes $l$, having the lower parts of their sides tapering, are then placed against the outer face of the inner collar, the ends of the spokes being squared and resting against the polygonal faces of the axle-box. The outer hub-collar is then slid on the axle-box and the nut screwed on the outer end of the box, thus firmly securing the spokes between the hub-collars.

It will be perceived that in my construction I dispense entirely with the employment of mortises and tenons, and that the hub-collars are prevented from turning, and that the construction is extremely simple and cheap.

I am aware that a hub consisting of a hollow cylinder having a circular beveled or concave clamping-disk cast with it, and adapted to clamp a series of spokes having enlarged inner ends, in conjunction with another flange screwed on the hollow cylinder, has heretofore been employed; and I therefore lay no claim to such construction, my invention being confined to the construction of parts pointed out in the claim, whereby the inner collar is separate from the axle-box, so that if a collar is broken it may be replaced without the necessity of providing for a new axle-box, and neither collar is screw-threaded around its central orifice.

I claim as my invention—

The combination, with the tapering axle-box $a$, provided with the circular shoulder $b$, polygonal portion $c\ d$, and cylindrical outer end, $e$, screw-threaded on its periphery, of the hub-collars $h\ h'$, having polygonal central orifices, nut $k$, and spokes $l$, having their squared ends resting against the polygonal faces of the axle-box, and having their front faces beveled inwardly and abutting against each other, and their side faces straight and abutting against the collars, substantially as described, and for the purpose set forth.

JOHN AMBROSE HUDGENS.

Witnesses:
C. M. NEEL,
S. B. WHITE.